May 26, 1964   J. H. GREENWOLD   3,134,314
DATA PROCESSING APPARATUS
Filed April 6, 1962   2 Sheets-Sheet 1

INVENTOR.
JOSEPH H. GREENWOLD
BY
ATTORNEY

May 26, 1964  J. H. GREENWOLD  3,134,314
DATA PROCESSING APPARATUS
Filed April 6, 1962  2 Sheets-Sheet 2
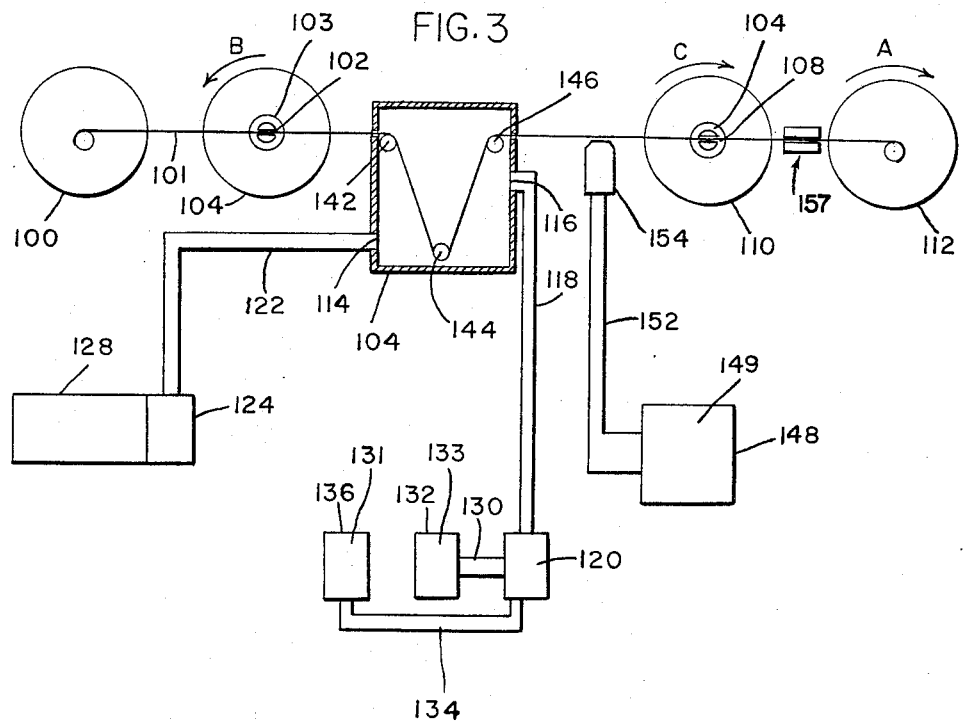
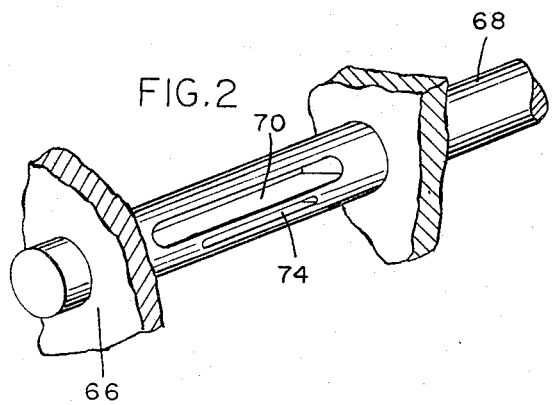
INVENTOR.
JOSEPH H. GREENWOLD
BY Stanley Belsky
ATTORNEY

United States Patent Office 3,134,314
Patented May 26, 1964

3,134,314
DATA PROCESSING APPARATUS
Joseph H. Greenwold, Newton Center, Mass., assignor to Itek Corporation, Lexington, Mass., a corporation of Delaware
Filed Apr. 6, 1962, Ser. No. 185,563
14 Claims. (Cl. 95—14)

This invention is directed to data processing apparatus, and more particularly to improved apparatus for processing indefinite or continuous lengths of photographic film. The apparatus is particularly suited for automatically processing film prior to its removal from a camera system.

Photographic systems, such as the type used in airborne applications, often consist of a supply spool of film, a camera, a film processing mechanism, and a film take-up spool. Film is advanced from the supply spool through the camera and processing mechanism to the take-up spool. The film processing mechanism may consist of a single tank containing a monobath solution or a number of tanks each containing the required developing, fixing and washing solutions. The above system generally uses a number of guide and drive rollers as well as a length of unusable film leader to thread the film through the system prior to exposure. The number of rollers is often upwards of one hundred, and the length of film leaders measures in some instances over two hundred inches.

The complexity of the film handling system often leads to film scratching, tearing, mechanical failure, and poor film development. In addition, systems of this type are often subjected to non-uniform, intermittent use, thus, adding further to its complexity. In order to overcome the problem of intermittent or non-uniform film travel, prior art systems have wound the film directly onto a separate storage spool immediately after exposure. The film is then threaded through the processing mechanism. While this insures uniform film processing, the problems arising due to the large number of rollers and long film leaders are not reduced. Other prior art devices employ a single tank wherein the required solutions are pumped in and out while the film is shuffled back and forth between the take-up spool and the heretofore mentioned separate storage spool. Elaborate precautions must be taken to eliminate chemical contamination of the camera elements and spools. Where possible monobath solution is used thereby reducing the number of passes required to process the film. In recent years, viscous monobath solutions have been substituted for the fluid solutions to replace tanks, thereby, reducing weight and size. However, while the improvements overcome many previous limitations, there has been little change in the number of rollers or in the amount of unusable film needed as a leader. Also, the devices are not completely automated and still require a human operator to change reels and thread the machine. Also, the possibilities of film scratching, tearing, and mechanical failure are ever present. As a consequence, the data processing devices are complex and unreliable even in their present form and especially in those environments where no human operator is present to make the reel changes, thread the machine correctly, and repair mechanical breakdowns.

These and other problems are overcome in my invention by selectively positioning a reel, for example, between the film supply spool and the camera. The reel has a slot in the shaft for allowing the film to advance therethrough as the film travels from the supply reel, through the camera to the take-up spool. For processing after exposure, a viscous monobath photographic processing solution may be used. The monobath is carried on a tape, one end of which is coupled to the shaft of the slotted reel. Upon the completion of the exposure run, the slotted reel is now rotated, thus winding the exposed film in contact with the viscous monobath to develop the film.

It is an object of this invention to provide an improved data processing apparatus for film that provides independent rewinding of film from between supply and take-up spools.

A further object of this invention is to provide an improved data processing apparatus for film that is low in weight and cost of manufacture.

Another object of this invention is to provide an improved automated data processing apparatus for film that is reliable in operation.

An object of this invention is to provide an improved automated data processing apparatus for film that eliminates chemical contamination of the spools and other elements in the camera.

In accordance with the invention, there is provided a data processing apparatus, comprising a supply spool for tape and a take-up spool. A reel is disposed between the supply and take-up spools for winding the tape. The reel includes a shaft having a slot therein adapted to allow tape to pass therethrough. A processing means is coupled to the reel for processing tape. A first drive means is coupled to the take-up spool for advancing the tape from the supply spool, through the slot in the shaft of the reel to the take-up spool. A second drive means is provided for withdrawing tape from the take-up spool into contact with the processing means and onto the reel whereby the tape is processed.

For a better understanding of the present invention, together with other and further examples thereof, reference is made to the following description taken in connection with the accompanying drawings, and the scope will be pointed out in the appended claims.

In the drawings:

FIGURE 2 is an enlarged perspective view of a portion of the reel assembly shown in FIGURE 1; and FIGURE 3 is a partially schematic drawing of a further embodiment of the invention.

Figure 1:
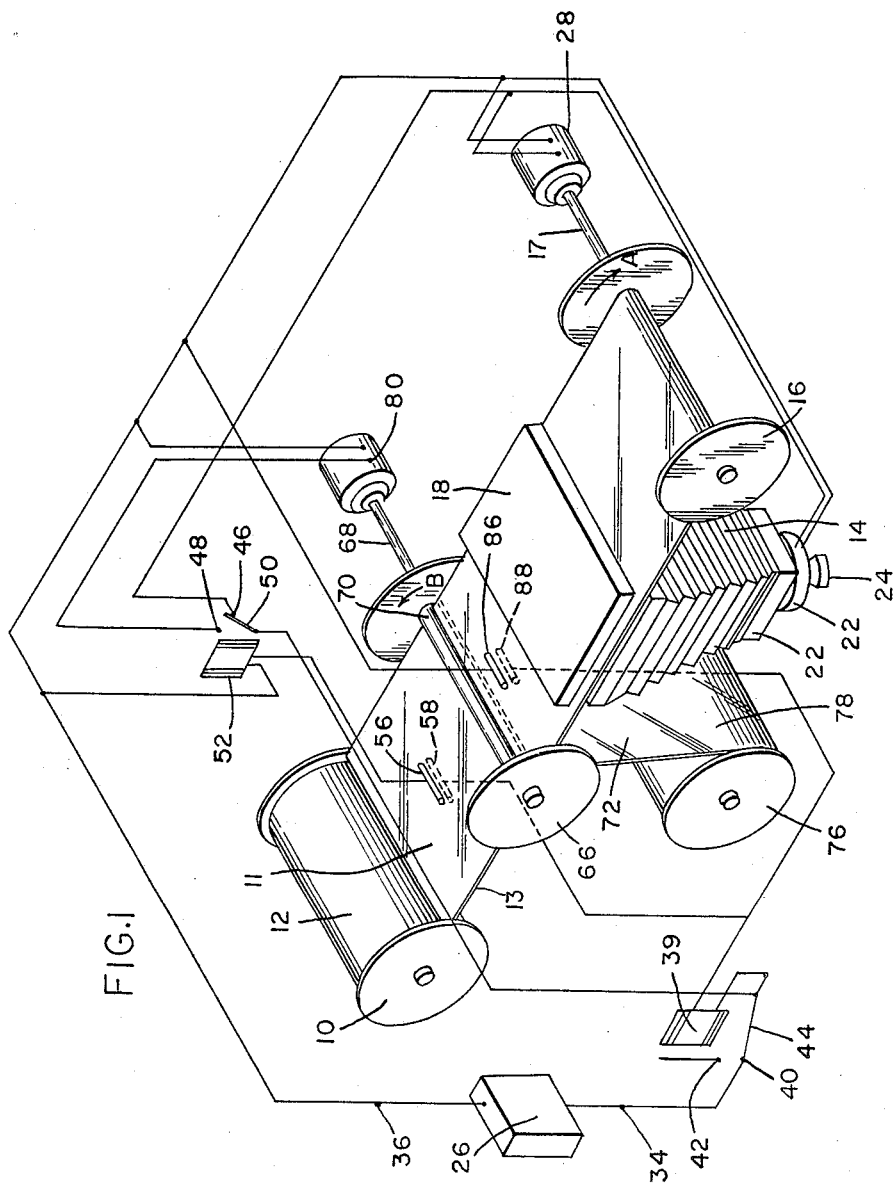
FIGURE 1 is a partially schematic perspective view of a film processing apparatus embodying the invention.

Referring now to FIGURE 1, there is here illustrated a data processing apparatus embodying the present invention wherein a tape or photographic film is processed. In operation, the system processes the film after exposure by rewinding the film from the take-up spool in contact with a tape bearing a viscous photographic film processing monobath solution without removing or changing the spools or rethreading the film.

As illustrated the data processing apparatus includes a supply spool 10 for the film 12 and a take-up spool 16. The film 12 is composed of a film backing 11 and an emulsion surface 13. The take-up spool 16 has an elongated shaft 17. A reel 66 is disposed between the supply spool 10 and the take-up spool 16. The camera 14 is positioned between the reel 66 and take-up spool 16. It will be apparent that the positions of the camera 14 and reel may be interchanged without departing from the present invention. The reel 66 (see also FIGURE 2) includes a shaft 68 having a slot 70 therethrough. The film 12 is coupled to the reel 66 through the slot 70.

In FIGURE 2, the slot 70 is longitudinal along the axis of the shaft 68. The length of the slot 70 is larger than the width of the film 12 and the height of the slot is at least twice the thickness of the film 12. The dimensions of the slot 70 accommodate the film 12 such that the film backing 11 rides on the top surface of the slot and the emulsion surface 13 touches neither the edges nor the bottom surface of the slot 70. The at rest position of the slot 70, that is, when the reel 66 is not rotating, is such that the longitudinal walls of the slot 70 are parallel to the plane of the film 12 passing therethrough.

The processing means in FIGURE 1 are coupled to the reel 66 and the take-up spool 16 for processing the film 12. The processing means includes a camera 14 for exposing the film and has a film platen 18, lens 20, electrically operated shutter 22 and an aperture lens 24. The camera is selectively positioned between the reel 66 and the take-up spool 16.

The processing means also includes means for developing exposed photographic film. In the preferred embodiment, the developing means includes a tape 72 stored on a spool 76. One end of the tape 72 is attached to the reel 66 by inserting the end in a groove 74, shown in FIGURE 2 in the shaft 68. The tape 72 carries a viscous photographic film processing monobath solution 76 on one surface. The monobath 76 is disposed adjacent the emulsion surface 13 of the film 12 when the tape 72 is brought into contact with the film 12.

The first drive means is coupled to the take-up spool 16 for advancing the film 12 from the supply spool 10, through the slot 70 in the shaft 68 of the reel 66, between the film platen 18 and the lens 20 of the camera 14 to the take-up spool 16. The first drive means includes an electric motor 28 coupled to the shaft 17 of the take-up spool for rotating the take-up spool 16 in the direction of the arrow A.

The second drive means is provided for withdrawing the film 12 from the take-up spool 16 and the camera 14 to the reel 66. The second drive means includes an electric motor 80 coupled to the shaft 68 of the reel 66 for rotating the reel 66 in the direction of the arrow B.

The control means is coupled to the first and second drive means. The control means includes an electric power supply 26 having a pair of terminals, 34 and 36. The control means also includes a first and a similar second relay. The first relay has two fixed contacts 40 and 42, a moveable contact 44, and a coil 39. The second relay has two fixed contacts 46 and 48, a moveable contact 50 and a coil 52. Also included in the control means are means for determining when the supply spool 10 and the take-up spool 16 are empty of the film 12. Included therein are two pairs of similar electrical conductive contacts. One pair is selectively positioned near the supply spool 10 between the supply spool 10 and the reel 66, and the other pair is selectively positioned near the film platen 18 of the camera 14 between the reel 66 and the camera 14. Each pair of contacts consists of a fixed contact 58 and 88 respectively and a moveable contact 56 and 86 respectively. For reasons of clarity, the mounting structure of the contacts are not shown. The contacts are mounted such that the film backing 11 rides against the moveable contacts 56 and 86 respectively, and the emulsion surface 13 does not touch the contacts 58 and 88. When there is no film between each pair of contacts, the moveable contacts 56 and 86 respectively are in electrical conductive contact with the fixed contacts 58 and 88. The control means includes the necessary electrical circuit for sequentially operating the motor 28 and the camera 14, stopping the motor 28 and the camera 14 and operating the motor 80 when the supply spool 10 is empty. In the electrical circuit, the supply terminal 34 is coupled to the fixed contact 40. The moveable contact 44 is coupled to the moveable contact 50. The fixed contact 46 is coupled to the motor 28 and the shutter 22 and the circuit is completed by coupling of the motor 28 and the shutter 22 to the terminal 36.

The moveable contact 44 is also coupled to the fixed contact 58 and the moveable contact 56 is coupled to one end of the coil 52 the other end of which is coupled to the terminal 36. The fixed contact 48 is coupled to one side of the motor 80 the other side of which is coupled to the terminal 36. When there is no film 12 between the contacts 56 and 58 respectively the electric circuit from the moveable contact 44 to the coil 52 is completed.

The coil 39 is coupled to the fixed contact 88. The moveable contact 86 is coupled to the terminal 36. When there is no film between the contacts 86 and 88 respectively, the circuit is completed between the moveable contact and the coil 39.

Prior to operation of the apparatus, one end of the film 12 is threaded from the supply spool 10 and between the contacts 56 and 58. Then the film 12 is inserted through the slot 70 in the shaft 68 of the reel 66. The film 12 is then threaded between the contacts 86 and 88 through the camera 14 with the film backing 11 against the film platen 18 and the emulsion surface 13 towards the camera lens 20. The end of the film 12 is coupled to the shaft 17 of the take-up spool 16. Also, one end of the tape 72 is removed from the roll 76, threaded to the reel 66 and attached to the groove 74 in the shaft 68 of the reel 66. The viscous monobath solution 78 on the tape 72 is adjacent the emulsion surface 13 of the film 12. In the at rest position, the moveable contact 44 is in contact with contact 42 and moveable contact 50 is in contact with fixed contact 46.

In operation, the moveable contact 44 is moved from the contact 42 to the contact 40, permitting the motor 28 and the shutter 22 to be simultaneously energized. The motor 28 rotates in the direction of arrow A and advances the film 12 from the supply spool 10, between the contacts 56 and 58 through the slot 70, between contacts 86 and 88 and advances the film 12 through the camera 14, winding the film 12 on the take-up spool 16. Simultaneously, the film 12 is exposed by the opening of the lens shutter 22. The motor 28 and shutter 22 can be controlled so as to provide continuous strip or frame photography at a constant or non-uniform rate of film advance or exposure.

When the supply of film 12 in the supply spool 10 is exhausted and there is no film between the contacts 56 and 58, the contacts 56 and 58 move together, closing the electric circuit between contact 44 and coil 52. The coil 52 is energized causing the moveable contact 50 to move to contact 48. The circuit of motor 28 and shutter 22 is opened halting further film travel and exposure.

In sequence, thereafter, the circuit is completed from contact 48 to the motor 80. Since the motor 80 is coupled to the shaft 68 of the reel 66, the reel 66 rotates in the direction of the arrow B. Thus, the film 12 is withdrawn from the take-up spool 16 through the camera 14 while simultaneously withdrawing the tape 72 bearing the monobath 78 from the roll 76. The monobath 78 and the emulsion surface 13 are brought into face to face contact for one step film processing.

When the film 12 is completely withdrawn from the take-up spool 16, the two contacts 86 and 88 move together and close the circuit between the coil 39, coupled to the contact 44, and the return terminal 36. Moveable contact 44 moves from the contact 40 to the contact 42 opening the circuit from the power supply 28 to the entire apparatus.

The reel 66 is removed from the processor and the film 12 further treated or used immediately.

Illustrated in FIGURE 3 is a three stage liquid processor utilizing a further embodiment of the present invention. Here, two slotted reels are disposed between the camera supply spool and take-up spool. The processing tank is disposed between the two slotted reels. While the camera is exposing film, film advances from the supply spool to the take-up spool through the slots in the slotted reels. To process the film, the film is withdrawn from the take-up spool onto one of these slotted reels. The film is shuttled back and forth through the processing tanks from one of these slotted reels to the other. By this process, the camera spools are insulated from the processing apparatus thereby eliminating the danger of chemical contamination of the spools and other elements in the camera.

The processor illustrated in FIGURE 3 broadly operates by advancing the film 101 from the camera supply spool 100 through the slot 102 in the shaft 103 of the reel 104. The film 101 is then advanced through a processing tank 106 and blower 154. Thereafter, the film is advanced through the slot 108 in the shaft 109 of the reel 110 to the exposure station 157 and to the camera take-up spool 112.

The first stage of operation exposes the film while in the second and third stages the exposed film is processed. In the first stage of operation, the reels 104 and 110 are inoperative and the processing tank 106 is empty. It is during the second and third stages that these elements are operative. The timing of the three stages and the tandem rotation of the reels 104 and 110, prevents contamination by the processing fluids of the exposure elements. That is, the camera supply spool 100, camera take-up spool 112 and the exposure station 157 are isolated from the two stages of film processing without the necessity of removing or changing reels or rethreading the film after exposure.

The tank 106 is sequentially filled and emptied of developing fluid 113 and washing and fixing fluid 137. The fluids 133 and 137 are stored in reservoirs 132 and 136 respectively. Reservoir 132 is coupled to the pump 120 by a pipe 134. The processing tank 106 is supplied with three rollers 142, 144, and 146 for guiding the film 101 through the tank 106. The tank 106 is also provided with an outlet port 116 which is coupled to a pump 124 by a pipe 122. The pump 124 is directly coupled to an exhaust fluid reservoir 128. The tank 106 is provided with an inlet port 116 which is coupled to the pump 120 by a pipe 118. The blower 154 is coupled to a source 148 of warm air 149 by a hose 152. Take-up spool 112 is rotatable in the direction of the arrow A; reel 104 is rotatable in the direction of arrow B; and reel 110 is rotatable in the direction of arrow C.

In operation, take-up reel 112 is rotated in the direction of the arrow A. This serves to remove the film 101 from the supply reel 100 and to expose the film 101 at the exposure station 157. After exposure, the rotation of the take-up reel 112 is stopped when the supply spool is empty of film to complete the first stage.

In the second stage, pump 120 fills the tank 106 with developing fluid 133. When the tank 106 is filled, reel 104 is rotated in the direction of arrow B. This serves to develop the film 101 as the film is withdrawn from the take-up reel 112, and wound on reel 104. With the end of the film between take-up reel 112 and reel 110, reel 104 is stopped. Pump 124 withdraws the spent developer fluid into reservoir 128 to complete the second stage.

In the third stage, the pump 120 fills the tank 106 with washing and fixing solution 136. After the tank 106 is filled, reel 110 is rotated in the direction of arrow C. This serves to wash and fix the image on the film 101. The blower 154 applies warm air 149 from the reservoir 148 to dry the film 101 emerging from the tank 106. When reel 104 is empty of film, the reel 110 is stopped to complete the third stage. The reel 110 can now be removed with the film 101 ready for use.

While there have been described what are at present considered to be the preferred embodiment of this invention, it will be obvious to those skilled in the art that various changes and modifications may be made therein without departing from the invention, and it is therefore aimed in the appending claims to cover all such changes and modifications as fall within the true spirit and scope of the invention.

What is claimed is:

1. A data processing apparatus, comprising:
a supply spool for tape;
a take-up spool;
a reel disposed between said supply and take-up spools for winding said tape, said reel including a shaft having a slot therein adapted to allow tape to pass therethrough;
processing means coupled to said reel for processing tape;
first drive means coupled to said take-up spool for advancing said tape from said supply spool, through said slot in said shaft of said reel, to said take-up spool;
second drive means coupled to said reel for withdrawing said tape from said take-up spool into contact with said processing means and onto said reel whereby said tape is processed; and
control means coupled to said first and second drive means for sequentially operating said first drive means, stopping said first drive means, and operating said second drive means when said supply spool is empty of said tape to remove tape from said take-up spool.

2. A data processing apparatus as in claim 1, wherein said tape is photographic film.

3. The combination of claim 2 including a camera for exposing said film as it is advanced from said supply spool to said take-up spool.

4. A data processing apparatus as in claim 3 wherein said processing means includes means for developing exposed photographic film.

5. A data processing apparatus as in claim 4 wherein said means for developing exposed photographic film includes a tape bearing a viscous photographic film processing monobath solution and means for juxtaposing said monobath with said exposed photographic film.

6. A data processing apparatus, comprising:
a supply spool for tape;
a take-up spool;
a reel disposed between said supply and take-up spools for winding said tape, said reel including a shaft having a slot therein adapted to allow tape to pass therethrough;
processing means coupled to said reel for processing tape;
first drive means coupled to said take-up spool for advancing said tape from said supply spool, through said slot in said shaft of said reel to said take-up spool;
second drive means coupled to said reel for withdrawing said tape from said take-up spool into contact with said processing means and onto said reel, thereby processing said tape; and
control means coupled to said first and second drive means for sequentially operating said first drive means, stopping said first drive means, and operating said second drive means when said supply spool is empty of said tape and stopping said second drive means when said take-up spool is empty of said film.

7. A data processing apparatus as in claim 6, wherein said tape is photographic film.

8. The combination of claim 7 including a camera for exposing said film as it is advanced from said supply spool to said take-up spool.

9. A data processing apparatus as in claim 8 wherein said processing means includes means for developing exposed photographic film.

10. A data processing apparatus as in claim 9 wherein said means for developing exposed photographic film includes a tape bearing a viscous photographic film processing monobath solution and means for juxtaposing said monobath with said exposed photographic film.

11. A data processing apparatus, comprising:
a supply spool for tape;
a take-up spool;
a first reel disposed adjacent said supply spool for winding said tape, said first reel including a shaft having a slot therein adapted to allow tape to pass therethrough;

a processing means coupled to said first reel means for processing tape;

a second reel disposed adjacent said processing means for winding said tape, said second reel including a shaft having a slot therein adapted to allow tape to pass therethrough;

exposure means coupled to said second reel and take-up spool for exposing said tape;

first drive means coupled to said take-up spool and exposure means for advancing said tape from said supply spool, through said slot in said shaft of said first reel, processing means, slot in said shaft of said second reel, exposure means, to said take-up spool, thereby exposing said tape;

second drive means coupled to said first drive means for withdrawing said tape from said take-up spool through said exposure means, slot in said shaft of said second reel and processing means to said first reel, thereby developing said tape;

third drive means coupled to said second drive means for advancing said tape from said first reel through said processing means to said second reel thereby processing said tape; and control means coupled to said first, second and third drive means for sequentially operating said first drive and exposure means, stopping said first drive and exposure means when said supply spool is empty of said tape, operating said second drive and processing means, stopping said second drive and processing means when said take-up spool is empty of tape, operating said third drive and processing means and stopping said third drive and processing means when said first reel is empty of said tape.

12. A data processing apparatus as in claim 11 wherein said tape is photographic film.

13. The combination of claim 12 wherein said exposure means includes a camera for exposing said film as it is advanced from said supply spool to said take-up spool.

14. A data processing apparatus as in claim 13 wherein said processing means includes a tank and a supply of photographic film processing fluids and means for sequentially emptying and filling said tank as said film is advanced or withdrawn through said tank.

References Cited in the file of this patent

UNITED STATES PATENTS

| | | |
|---|---|---|
| 2,572,357 | Land | Oct. 23, 1951 |
| 2,966,103 | Erikson | Dec. 27, 1960 |
| 2,973,157 | Korsch | Feb. 28, 1961 |
| 3,041,952 | Schreck | July 3, 1962 |